June 23, 1953 D. V. STELLIN 2,643,142

FLOATING TOOL MOUNTING MEANS

Filed Oct. 24, 1949 3 Sheets-Sheet 1

INVENTOR.
DOMNIC V. STELLIN.

BY Samuel Weissman
ATTORNEY.

June 23, 1953 D. V. STELLIN 2,643,142
FLOATING TOOL MOUNTING MEANS
Filed Oct. 24, 1949 3 Sheets-Sheet 2
FIG. 9
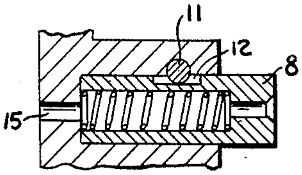
FIG. 10
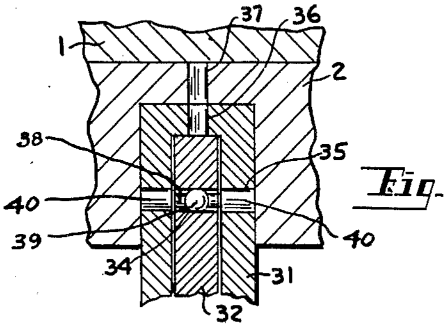
FIG. 11
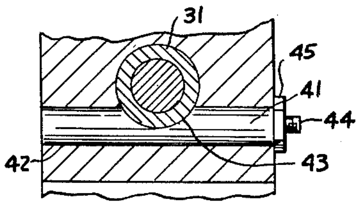
FIG. 12
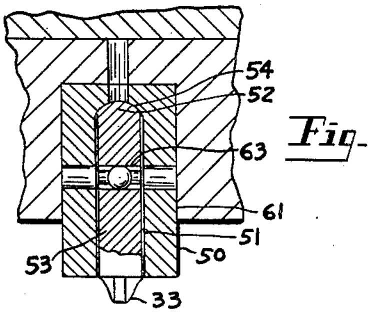
FIG. 14
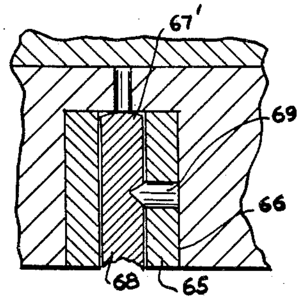
FIG. 13
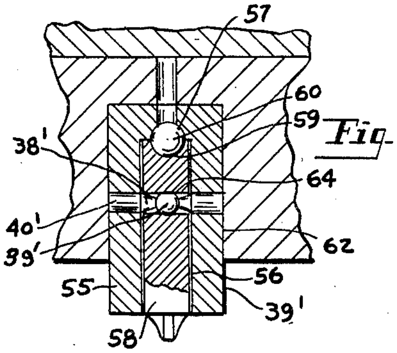
FIG. 15
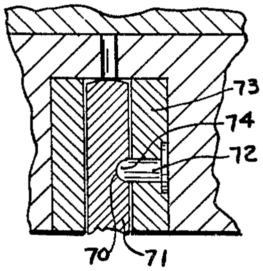
FIG. 17
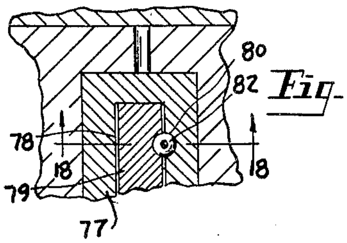
FIG. 16
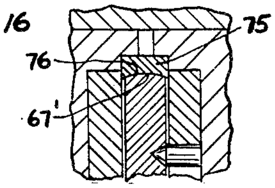
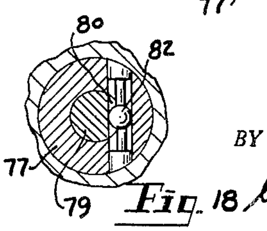
INVENTOR.
DOMNIC V. STELLIN.
BY Samuel Wiseman
ATTORNEY.

June 23, 1953 D. V. STELLIN 2,643,142

FLOATING TOOL MOUNTING MEANS

Filed Oct. 24, 1949 3 Sheets-Sheet 3

INVENTOR.
DOMNIC V. STELLIN.
BY Samuel Newman
ATTORNEY.

Patented June 23, 1953

2,643,142

UNITED STATES PATENT OFFICE 2,643,142

FLOATING TOOL MOUNTING MEANS

Domnic V. Stellin, Chicago, Ill.

Application October 24, 1949, Serial No. 123,184

2 Claims. (Cl. 287—20)

This invention relates to an apparatus for making screw blanks and particularly to an apparatus which forms the screw head or the like and the recess or socket therein, without any further operation on the blank.

This operation has previously been accomplished by striking the stock successively with two hammers. The first hammer makes a preformed unfinished head, and the second hammer forms the recess or socket. Since the preformed head is often non-symmetrical, the second hammer becomes deflected and would break if it did not have clearance in its adapter or holder. The hammer is ordinarily retained in its adapter by means of a simple cross-pin.

The invention pertains more especially to an improvement in the retaining means for the second hammer. The conventional cross pin becomes bent and ultimately tightens the hammer, resulting in the destruction of the latter.

The principal object of my invention is to provide an apparatus of the character described in which the finishing hammer or punch is mounted in the hammer block on the knee action principle for the purpose of properly following the center of the wire from which the blank is produced. In other words the hammer and its mounting are so designed that the hammer will follow the flow of metal accurately and at the same time make up for irregularities in the wire or other defects, without breakage of the hammer at the part which forms the recess or socket, and at the same time will produce blanks in such numbers that heretofore have not been possible. This is accomplished by the fact that the device of my present invention will prevent the usual defect which causes the hammer to jam in the adapter, with the usual breakage of the part of the hammer which impresses the recess or socket in the head. With this invention ample means is provided to relieve the strain on the hammers now in use, leaving the hammer completely free to follow the center of the wire for the described purpose. With existing devices it is not possible to produce blanks or the like upwards of 100,000 with one hammer, without breakage of the hammer at the point described. In fact it is often the case that with existing devices a punch will break soon after a small number of blanks have been produced.

Another object of my invention is to provide a hammer for the final operation and which provides the blank with the recess or socket, the hammer being of such construction that it can be hardened to an unusual degree for high production without becoming so brittle as to break in use.

A further object of my invention is to provide an apparatus for cold heading purposes which can be produced economically and very cheaply, thereby insuring not only a profit for the manufacturer but also enabling him to meet high production schedules which previously were not possible especially when heavy production was required on short notice by the users of such devices.

Still another object of the invention is to provide an apparatus of this character that causes the metal to flow evenly and thereby produce an accurate head which will pass the highest production standards without further operations on the blank. In this connection the second hammer causes complete filling of the matrix or die. At the same time the head will have a recess or socket which is accurately located in the center, without special attention, whether the head is of the flat type, oval, round, pan shaped, or in fact of any desired type or configuration.

In the accomplishment of these objects I employ a novel so-called ball pin for retaining the hammer in its adapter. This pin replaces the conventional simple pin which has a loose fit in the hammer and a tight fit in the surrounding adapter, which usually causes the pin to bend under the pressure of the heading operation. My novel pin is formed with a ball or sphere between its ends. The sphere has a sliding fit in the hammer, and the ends of the pin have a sliding fit in the adapter. The ends preferably have the same circumference as the sphere, and the parts of the pin between the sphere and the ends are reduced in diameter. Thus, the pin has no more than a two-point engagement with the hammer and therefore will not bind and eventually destroy the hammer, even if the pin becomes bent in operation.

The slidable mounting of the ball pin in the hammer and adapter insures complete freedom of the hammer in the adapter as well as around the ball pin itself, thereby preventing the usual jamming of the pin and hammer, or of the hammer and adapter, especially when the pin bends under the tough hammering in high production. The clearance between the pin and hammer of the present devices, and the tight fit between the pin and the adapter of the existing devices encourages the jamming of the tools and binding of the same, resulting in breakage as described, expensive replacement of tools and loss in production. The bending of the pin of existing devices is almost impossible to avoid in the manufacture of blanks made from hard wire, such as stainless steel and other types of hard wire. The bending of the pins in existing devices occurs when the blanks are produced by high speed machines operating, for example, at 13,000 strokes per hour. For this reason, the high speed machines are usually slowed down to less than 10,000 strokes per hour regardless of the type of wire used.

With the novel retaining pin of this invention, I have produced blanks at the full speed of modern machines, for example, 13,000 strokes per hour, and the hammers produced more than 100,000 blanks per hammer without breakage. Comparative tests by numerous manufacturers, using existing devices and my novel arrangement as described herein, have shown that a conventionally mounted finishing hammer breaks before producing even a substantial fraction of the number of blanks that can be produced by a hammer mounted according to my invention, without breakage.

A still further object is to construct the striking point of the second or finishing hammer in such a manner that it will have long life in operation and will itself be produced by simpler and less expensive means than heretofore. The striking point or tip of the hammer is generally formed by intersecting vanes having sharp corners at the intersection. Such corners readily become broken in use. This is also true of sharp cornered tools that must be used in forming the tip of the hammer. According to the invention, the vanes are rounded at the intersection, and the forming tools are similarly shaped, so that the fragile sharp corners are eliminated throughout the fabrication and the use of the hammer.

The invention is fully disclosed by way of example in the following description and in the accompanying drawings in which.

Figure 1:
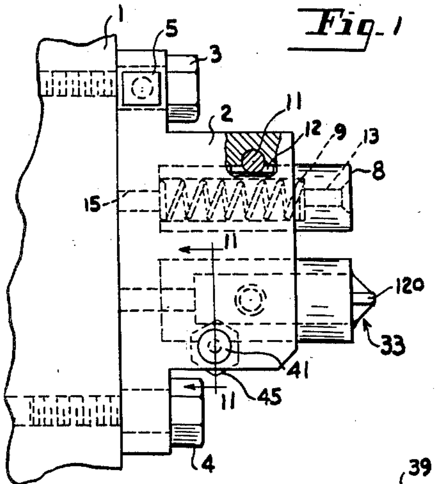
Figure 1 is a side elevation of the block and hammer assembly.
Figure 2:
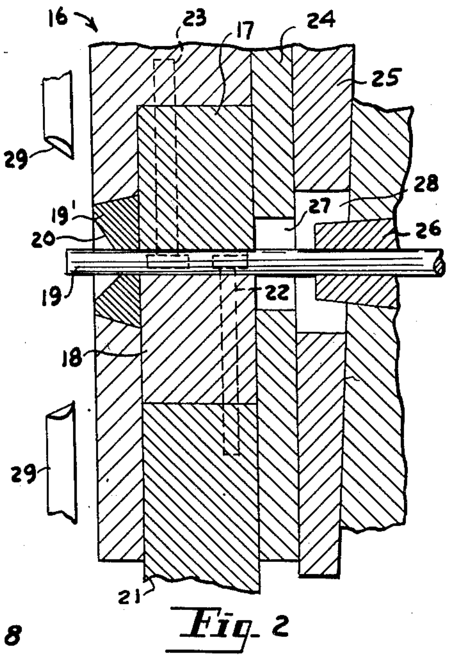
Figure 2 is a vertical section of the matrix and stock feeding mechanism.
Figure 8:
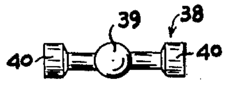
Figure 5:
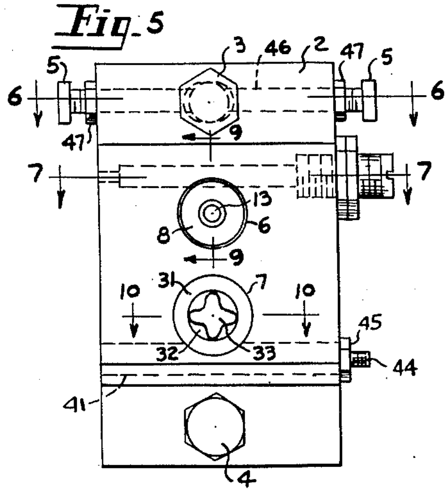
Figure 5 is a vertical elevation of the hammer assembly at right angles to Figure 1.
Figure 6:
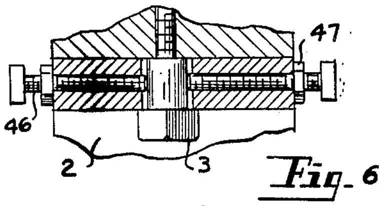
Figure 7:
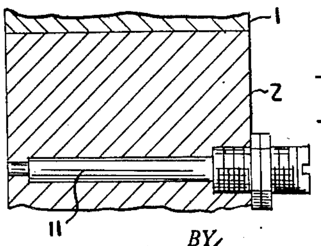
Figures 19, 20:
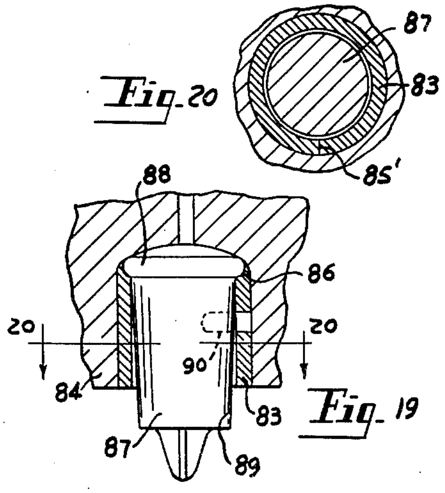
Figure 27:
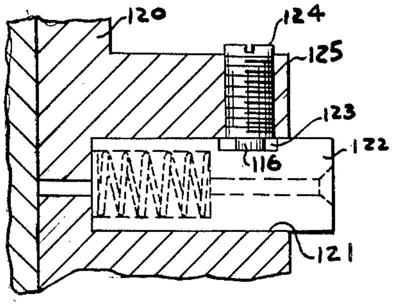
Figure 23:
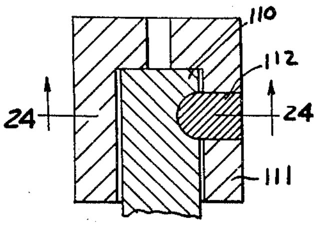
Figure 24:
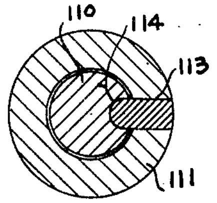
Figures 25, 26:
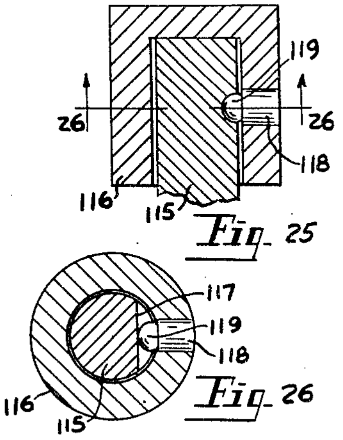
Figure 21:
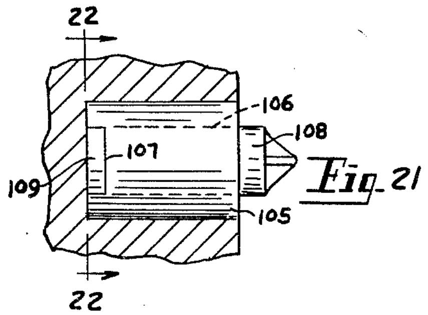
Figure 22:
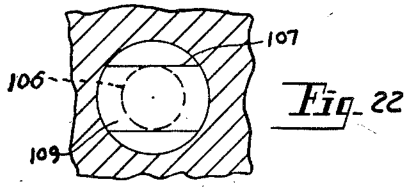
Figure 28:
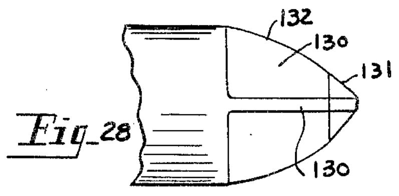
Figure 29:
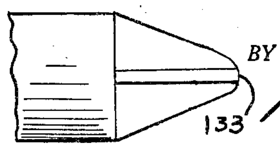

Figures 6 and 7 are sections on the lines 6—6 and 7—7 of Figure 5;

Figure 8 is a detail elevation of the ball pin for retaining the finishing hammer;

Figures 9 and 10 are sections on the lines 9—9 and 10—10 respectively of Figure 5;

Figure 11 is a section on the line 11—11 of Figure 1;

Figures 12 to 17 are sections similar to Figure 9, showing modified means for retaining the finishing hammer in its adapter;

Figure 18 is a section on the line 18—18 of Figure 17;

Figure 19 is a detail section showing another modified means for retaining the finishing hammer;

Figure 20 is a section on the line 20—20 of Figure 19;

Figure 21 is a detail section of another modified means for retaining the finishing hammer;

Figure 22 is a section on the line 22—22 of Figure 21;

Figure 23 is a detail section of another modified means for retaining the finishing hammer;

Figure 24 is a section on the line 24—24 of Figure 23;

Figure 25 is a longitudinal section of another modified hammer in its adapter;

Figure 26 is a section on the line 26—26 of Figure 25;

Figure 27 is a detail section similar to Figure 9, showing a modified means for retaining the pre-forming hammer;

Figure 28 is an enlarged detail of the tip of the finishing hammer;

Figure 29 is a similar detail of a somewhat modified form.

Reference to these views will now be made by use of like characters which are employed to designate corresponding parts throughout.

In Figure 1 is shown the assembly for a two-stage forming operation. The assembly is conventional except in matters that will be pointed out.

To a block holder 1 is secured a hammer block or head 2 by means of upper and lower bolts 3 and 4 respectively. At the upper end a pair of set screws 5 is inserted laterally to engage the bolt 3, and similar set screws are provided at the bolt 4.

The block 2 is formed with a pair of horizontal cylindrical cavities 6 and 7 opening into the forward space at the block. In the cavity 6 is mounted a cylindrical pre-forming hammer 8 having a slightly smaller diameter than the cavity in order to move freely therein. A substantial cavity 9 is formed from the rear end of the hammer in order to receive a compressed spring 10 which seats on the bottom of the cavity 6. The hammer 8 is held in the cavity, against the pressure of the spring, by a cross pin 11 inserted in the block 2 across the hammer and received in a recess 12 in the wall of the hammer. The recess is longer than the diameter of the pin to permit limited axial movement of the hammer.

From the forward end of the hammer is formed an axial hole 13 having a chamfer at the forward extremity. This formation constitutes a die for pre-forming a head on the end of a piece of screw stock. From the rear surface of the block, a hole 15 is drilled to the bottom of the cavity 6 and serves as a knockout opening for parts that may become lodged in the cavity 6 in case of breakage. The saddle and parts carried thereby are moved forcibly towards the stock which is held in a feeding and gripping device that will now be described.

A die block 16 contains a pair of gripping dies 17 and 18 one above the other. The stock wire 19 is received between the dies and passes through a matrix 19 at the forward face of the block 16. The matrix is formed with a conical recess 20 for a flat head screw around the stock, and the recess aids in shaping the head on the stock as will presently be shown.

The die 18 rests upon a holder 21 and is secured by a screw 22. The die 17 is secured by a screw 23 but is adapted to slide in and out of engagement with the stock by movement of the cross head of the machine (not shown) as the latter travels back and forth, as known in the art.

Figure 3:
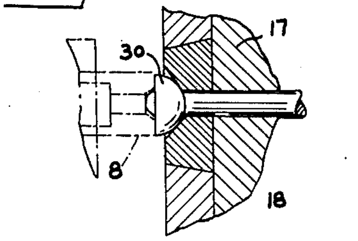
Figures 3 and 4 are details of Figure 2, showing the two forming operations on the stock.

A plate 24 lies behind the dies, and behind this is a spaced main frame portion 25. Between these parts is inserted a wedge 26 through which the stock passes. The stock also passes through a guide 27 in the member 25. The wedge has the substantial opening 28 around the stock and guide. When the dies have been clamped on the stock, they are further secured by tightening the wedge 26 in the manner familiar in cold heading machines. The stock is fed intermittently between the dies 17 and 18, and the headed lengths are severed by opposed cutting dies 29 after the head has been completed by a second operation that will presently be described. The first operation, consisting of the impact of the hammer 8 on the stock forms an unfinished head 30 as shown in Figure 3.

The cavity 7 is designed to receive an auxiliary hammer holder or retainer 31 as shown in Figure 10. The open end of the holder receives in turn the second hammer 32 which has a forming tip 33 at the forward end. The shape of the tip will be described in detail.

In one embodiment of the invention a diametrical hole is drilled through the body of the hammer 32. The sides of the adapter 31 are formed with holes 35 that aline with the ends of the hole 34 of the inserted hammer. The back wall or bottom of the holder has a central hole 36 alining with a hole 37 in the back of the hammer block 2 for knockout purposes.

The hammer 32 is held in the holder 31 by a hardened ball pin 38 shown in Figure 8. Centrally on the pin is formed a ball or sphere 39 that will pass through either hole 35 and lie somewhat loosely in the hole 34. The ends of the pin 38 are formed with somewhat enlarged cylindrical heads 40 that also insert loosely in the holes 35 when the pin has been passed through one hole 35, into the hole 34 as already indicated, and into the remaining hole 35.

This assembly of hammer and holder is inserted into the cavity 7. The wall of the cavity will obviously hold the pin from falling out of the holder. The holder, however, must be retained in the block 2. This is accomplished by inserting a bolt 41 in a hole 42 traversing the cavity 7 and the block 2. The long shank of the bolt has a lateral recess 43 that coincides with the cavity in order to permit subsequent insertion of the holder. The thread 44 on the bolt 41 remains exposed after insertion. A nut 45 screwed on the thread and against the block draws the wall of the recess 43 against the surface of the holder 31 with such firmness as to prevent loosening of the latter. Similarly the set screws 5 for the bolts 3 are threaded at 46 to receive the lock nuts 47.

In the modification shown in Figure 12, the holder 50 is formed as formerly with a cylindrical cavity 51 which, however, has a concave spherical inner end 54. The hammer 53 has a convex spherical end 52 of slightly smaller diameter than the end 54 to fit somewhat loosely therein. In all cases the diameter of the hammer is slightly less than the inside diameter of the holder to provide slight play around the spherical connecting parts in many of the forms herein described.

Another modification is shown in Figure 13 where the holder 55 has a cylindrical cavity 56 with a substantially semispherical recess 57 at the inner end. In this case the hammer 58 has a spherical recess 59 in its rear end, having substantially the same radius as the recess 57 and preferably somewhat less than semi-spherical. A steel ball 60 lies in both recesses.

The holders 50 and 55 are drilled diametrically at 61 and 62 respectively, and the hammers 53 and 58 are drilled at 63 and 64 respectively to receive a ball pin. The holder in each case is reamed or polished inside the hole after the part has been hardened. The holder receives the hammer with clearance and is retained by a bolt 41.

The ball pin is of a modified form. It tapers at 38′ toward the central ball 39′, and the ends are cylindrical heads 40′ which may have the maximum diameter of the tapered portion.

In the modification shown in Figure 14, the holder 65 has its cylindrical cavity 66 formed from end to end. The hammer 67 has a conical recess 68 for receiving the pointed end of a conical set screw 69 threaded into a wall of the holder. The inner end of the hammer is formed with a crown or convex surface 67′. The crown may engage the hammer block for a slight swivel movement in the clearance provided between the hammer and the wall of the recess. The construction shown in Figure 15 is similar except that the recess 70 in the side of the hammer 71 is rounded, and the retaining pin or screw 72 in the holder 73 has a corresponding rounded end 74.

In either of the last two modifications, a slug or pad 75 with a concave spherical face 76 may be inserted behind the hammer to receive the crown 67′ thereof, as shown in Figure 16.

The holder 77 in Figure 17 has the usual cylindrical cavity 78 to receive the hammer 79. Both the holder and the hammer are formed with matching semi-cylindrical recesses 80 and 81 respectively to receive the ball 82 of the ball pin 82′ journalled in the holder. This arrangement is distinguished from Figure 1 wherein the ball is received entirely in the recess 90. Lateral recesses for the ball may also be employed in Figures 12, 14 and 16. The ends of the ball pin are received in properly positioned holes in the holder 77.

In each of the modifications, the holder is held in the block by a threaded pin 41 with concave recess 43 and nut 45, as shown in Figures 5 and 11, and the hammer always has slight clearance in the holder.

In Figure 19 is shown a holder 83 in which the cylindrical cavity 84 extends from end to end and the wall is slit at 85 from end to end on a center line or elsewhere. In the end of the holder is formed a seat 86, and the inner end of the hammer 87 is formed with a head 88 to be received on the seat. The outer surface of the hammer may taper at 89 from the inner to the outer end to provide the necessary clearance in the holder.

The hammer has a lateral recess 90 to receive a similarly shaped pin or may have a complete diametrical hole, for receiving a wall similar to the ball of the ball pin 38. The headed ends of the pin in either case are received in appropriately positioned holes in the adapter.

Another modified assembly is shown in Figures 21 and 22. The holder 105 has its cylindrical cavity 106 extending from end to end, and across the inner end of the holder is formed a straight sided slot 107. The hammer 108 has its inner end formed with a straight-sided head 109 that is to fit in the slot 107 with a clearance of about .010 to .015. The hammer is held in the holder by any of the means previously described.

In the modification shown in Figure 23, the punch 110 is received in the holder 111 with the usual clearance and is held by a different form of pin. The pin 112 is rectangular in cross section, and the retaining end thereof is formed as a somewhat spheroid convex surface 113 which is received with clearance of about .010 in a similarly shaped cavity 114 in the punch. The shorter side of the rectangular pin lies lengthwise of the punch and holder.

In Figures 25 and 26 the punch 115 again has clearance in the holder 116 and is formed with a cylindrical cavity 117 in its side. The pin 118 is cylindrical and has a spherical head 119 received in the cavity 117. The diameter of the head is slightly smaller than that of the pin and has a small clearance in the cavity 117.

In Figure 27 is shown a modified construction for holding the first hammer, which is the hammer 8 of Figure 1. The saddle 120 is constructed substantially as previously described and has a cavity 121 for the hammer. The inserted hammer 122 is also constructed as previously set forth, with a longitudinal slot 123 in its side. The cross pin 11 is replaced by a stud 124 screwed into a tapped hole 125 radial of the cavity 121 in the block 120 and having a reduced end 126 which is not threaded and is received loosely in the slot 123. Lock nuts (not shown) may be mounted on the stud or screw 124 to prevent it from working loose.

As already indicated, the straight hammer strikes the stock 19 and shapes the incompletely formed head thereon. The saddle is then shifted by known means to bring the center line of the second hammer into position to strike the head 30.

Figure 4:
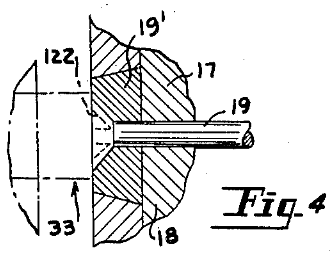

The nose 33 of the second hammer is shaped to form the desired recess of any configuration, as in any of my patents on screws. In the present example the nose consists essentially of a pair of vanes 130 that taper forwardly and cross each other at forward ends. Thus, they form a somewhat cross shaped socket 131 in the finished head 122, Figure 4, with special characteristics described elsewhere in the art. The important point here is that the forward end or apex of each of the vanes is devoid of sharp corners.

This is illustrated in Figures 28 and 29. In Figure 28 the apex of each vane 130 is conical at 131, the extreme tip being slightly rounded, and the nose portion adjacent to the apex has a relatively large radius of curvature at 132. In Figure 29 the apex 133 is formed on a substantial radius of curvature over the entire tip and merges into the edges of the vane. This is a spherical end or nose, in conjunction with the intersecting vane, while the construction shown in Figure 28 is known as a bullet nose.

These constructions are important from the standpoint of the fabrication and operation of the hammer. The hammer is formed from a matrix (not shown) which in turn is formed by a punch. If the hammer has sharp corners the punch must also have sharp corners and such a punch will damage the matrix. These sharp corners of the hammer are also likely to fracture the screw head shaped thereby. It is known in the art that the punch and the matrix, or master die, must be made from very hard and tough material and heat treated, and that a sharp cornered tool of such composition will break or fracture under the high pressure to which it is subjected in fabrication. The fracture of the hammer in actual operation results from similar causes. Such fracturing of the punch, matrix and hammer is avoided by the elimination of sharp corners at the apex as herein described.

The general operation of the device consists in first striking the stock with the pre-forming hammer 8 and then with the finishing hammer as described, for example, in the patent to Robertson, No. 1,003,657, of September 19, 1911. The pre-formed head 30 may not be symmetrical and, in such case, will deflect the second hammer. In order to avoid breakage of the tip of the second hammer under deflection, this hammer is allowed some clearance in the holder and is held by a retaining means that permits lateral movement in the clearance. Such retaining means is shown in the prior art as a simple cross pin having its ends drive-fitted in the bushing and having a rather loose fit in the hammer.

The improvement contributed by this invention lies in the retaining means. The conventional simple pin becomes bent at a high speed operation of about 13,000 strokes per hour as a result of which it jams and finally breaks the tool. My novel pin assures real and positive universal movement which is not obtained in prior art devices.

According to my invention, the ball pin 38—40 has a sliding fit in the holder and hammer. The clearance is sufficient to allow for defects and unavoidable tolerances. Thus, the ends 40 are not tight in the holes 35 of the holder, nor is the ball 39 tight in the hole 34 of the hammer.

The ball 39 engages the wall of the hole 34 at not more than two points of tangency. This small area of engagement, as well as the freedom of the pin ends in the holder, precludes jamming of the pin and breaking of the hammer even if the pin should bend.

Hammers assembled by conventional means ordinarily become broken on producing a relatively small number of blanks. Numerous tests with the assembly herein described have shown no necessity to reduce the speed of the machine below 13,000 strokes per hour and has produced more than 100,000 blanks per hammer without breakage of the hammer.

The various pins, holders, punches and other parts are not confined to the particular combinations in which they are shown but may be interchanged from one combination to another as desired.

Although specific embodiments of the invention have been illustrated and described, it will be understood that various alterations in the details of construction may be made without departing from the scope of the invention as indicated by the appended claims.

What I claim is:

1. In a hammer assembly, a hammer block, an auxiliary hammer holder in said block having a cavity extending lengthwise therein and having aligned openings through the side walls contiguous with the cavity, a hammer received with clearance all around within said cavity, said hammer having an exposed working end extending beyond said holder and an opening extending transversely therethrough in alignment with the openings in the adapter walls when in the assembled relation, and a cross pin within said hammer opening and having its ends loosely positioned within the aligned openings in said holder and including a spherical section intermediate its ends having a sliding fit in said hammer opening.

2. In a hammer assembly, a hammer block, an auxiliary hammer holder having a cavity extending partially therethrough in an axial direction and having aligned openings contiguous with the cavity portion extending through the side walls of the holder, a hammer received with clearance all around in the cavity and having a working end extending forwardly free of the cavity when in the assembled relation, said hammer having a transverse opening adapted to align with the openings in the holder when in the assembled relation, a cross pin extending through the opening in the hammer and having its ends loosely received within the aligned openings in the holder, said cross pin having a bulbous center portion of curvilinear contour. to engage the hammer in a sliding fit thereby to mount the hammer within the cavity to provide universal floating action.

DOMNIC V. STELLIN.

References Cited in the file of this patent

UNITED STATES PATENTS

| Number | Name | Date |
|---|---|---|
| 1,021,736 | Glover et al. | Mar. 26, 1912 |
| 1,357,843 | Cashman | Nov. 2, 1920 |
| 1,366,359 | Clouse | Jan. 25, 1921 |
| 1,368,484 | Cashman | Feb. 15, 1921 |
| 1,476,696 | Deely | Dec. 11, 1923 |
| 1,903,576 | Skeel et al. | Apr. 11, 1933 |
| 2,082,085 | Tomalis | June 1, 1937 |
| 2,125,272 | Erdman | Aug. 2, 1938 |
| 2,244,381 | Wilcox | June 3, 1941 |